United States Patent [19]
Barowitz

[11] 3,805,260
[45] Apr. 16, 1974

[54] AUTOMATIC INTRUDER ALARM

[76] Inventor: Peter Jack Barowitz, Century Works Lewisham, London S.E. 13, England

[22] Filed: May 19, 1972

[21] Appl. No.: 255,040

[30] Foreign Application Priority Data
Nov. 30, 1967 Great Britain .................. 54626/67

[52] U.S. Cl. .............. 340/258 B, 307/117, 340/261
[51] Int. Cl. ........................................... G08b 13/22
[58] Field of Search ........ 340/261, 258 B, 15.5 GC, 340/15.5 TC; 307/117

[56] References Cited
UNITED STATES PATENTS
3,261,009  7/1966  Stetten et al. ........................ 340/261
3,364,477  1/1968  McDonough ....................... 340/261

Primary Examiner—John W. Caldwell
Assistant Examiner—Glen R. Swann, III
Attorney, Agent, or Firm—Eric H. Waters

[57] ABSTRACT

An alarm system uses seismic vibration detectors (geophones) for detecting the movement of persons or vehicles in an area. Adjacent groups of one or more detectors in an array are connected respectively to two separate wiring circuits which are connected to alarm output means, adjacent groups of detectors in each wiring circuit being connected in anti-phase with each other. Electrical means suppresses signals outside a predetermined vibration pattern.

9 Claims, 4 Drawing Figures

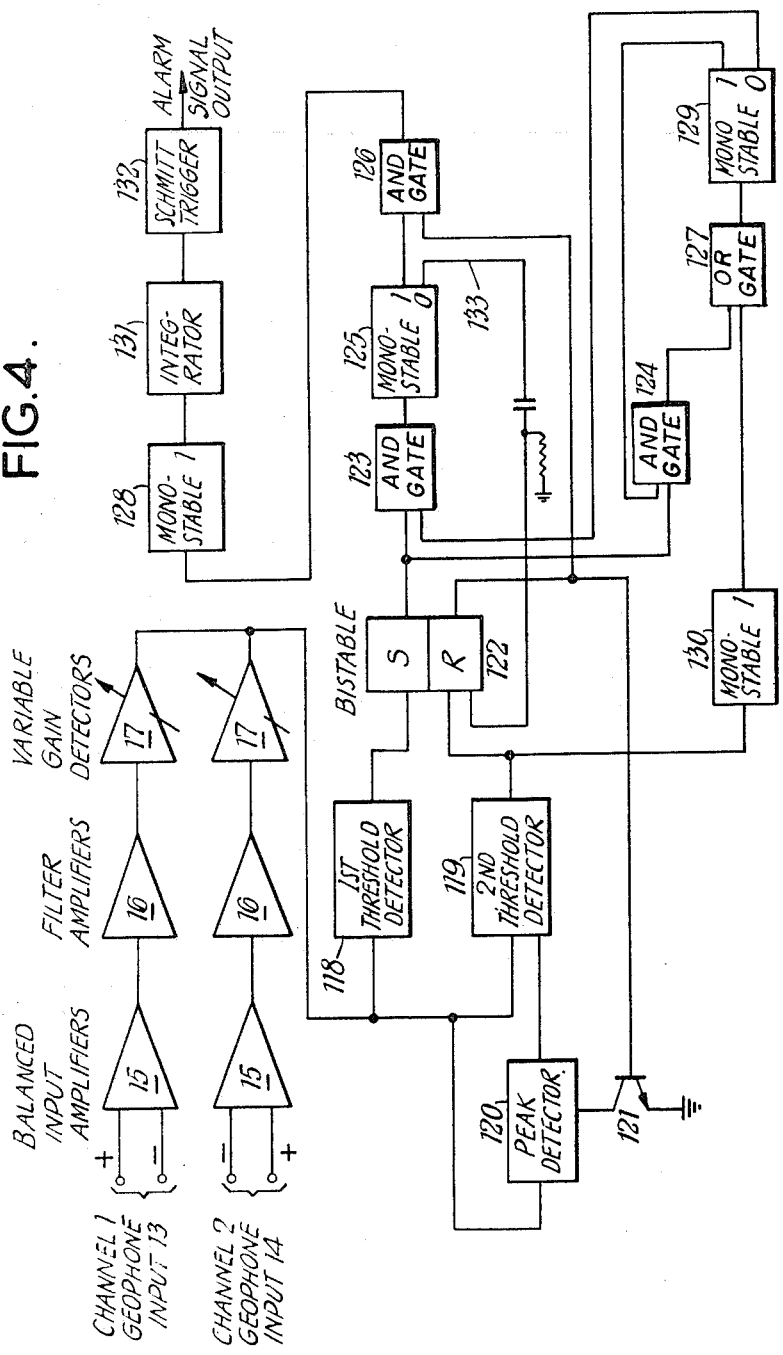

AUTOMATIC INTRUDER ALARM

BACKGROUND OF THE INVENTION

This invention relates to an alarm system and in particular to an alarm system using seismic vibration detectors (geophones) for detecting the movement of persons or vehicles in an area. An important requirement is that movements outside the area remain undetected as this would constitute a false alarm and too many false alarms destroy the confidence of the operators in the alarm system.

BRIEF SUMMARY OF INVENTION

The present invention provides an alarm system comprising an array of seismic vibration detectors connected by one or more wiring circuits to alarm output means. Preferably the array of seismic vibration detectors is a linear array and the wiring circuits are connected through variable amplifiers to the alarm output means.

The system additionally includes means for suppressing signals outside a predetermined vibration pattern. In particular, it is desirable to eliminate operation of the alarm output means by vibrations which are too frequent, for example caused by footfalls of small animals, and to eliminate operation of the alarm output means by a single shock vibration, for example a brick thrown into the area. It is also desirable to eliminate operation of the alarm output means by vibrations having too long a vibration period. Advantageously, the system is arranged to respond to vibrations caused by human footfalls.

For suppressing signals having a too high repetition rate, a first suppressing device may be provided which preferably comprises a Schmitt trigger circuit to receive the vibrations from the wiring circuits and having built-in hysteresis which while triggering in response to a pulse of a certain size or greater will only reset after sufficient time has elapsed for the pulse to have decayed to a low level. A second suppressing device, preferably in the form of a second Schmitt trigger circuit, may be provided to receive pulses caused by triggering of the first Schmitt trigger circuit, the second trigger circuit being set at a fixed level too high to be triggered by a single pulse or by pulses at a very low repetition rate.

Alternatively, for the purpose of suppressing signals having a too long vibration period, a first suppressing means may be provided which means preferably comprises two threshold detector circuits to receive the vibrations from the wiring circuits, the first of which triggers from a signal pulse of a fixed amplitude or greater and the second of which triggers when the pulse has decayed to a fixed proportion of the maximum amplitude of that signal pulse. The first detector triggers a timing circuit which opens a gate for a fixed time, while the second detector produces a trigger pulse which passes through that gate only if it occurs within that time. Second suppressing means may be provided for restricting a too high repetition rate; this means preferably comprises a second timing circuit which is triggered by the second threshold detector and which closes a second gate, interposed before the first timing circuit, for a certain time. If a second signal pulse triggers the first detector again within that time, the trigger pulse fails to pass through the second gate into the first timing circuit and is rejected. Third suppressing means preferably in the form of an integrator and a Schmitt trigger circuit may be provided to receive pulses caused by the second detector and passed by the two gates, the Schmitt trigger being set at a fixed level too high to be triggered by a single pulse or by pulses at a very low repetition rate.

BRIEF DESCRIPTION OF DRAWINGS

FIG. 4 is a circuit block diagram of an alternative alarm system according to the invention.

DETAILED DESCRIPTION

Figure 1:
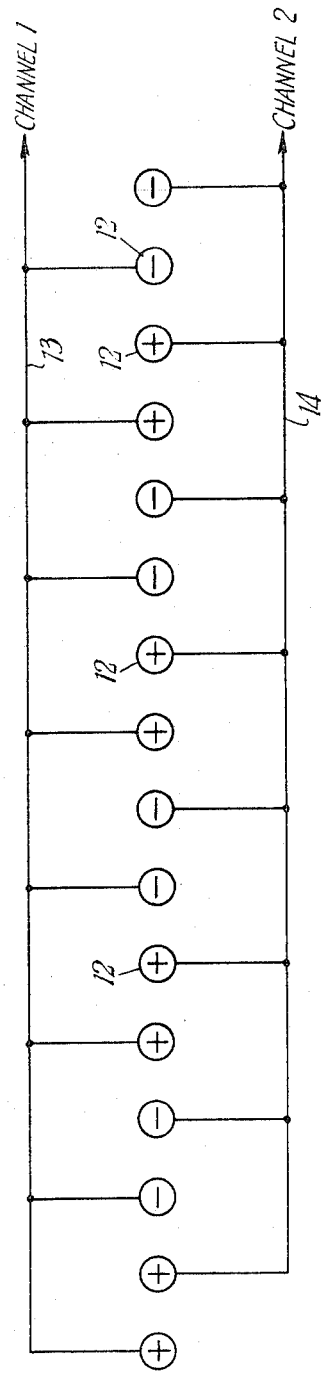
FIG. 1 shows diagrammatically an array of geophones and their connections.
Figure 2:
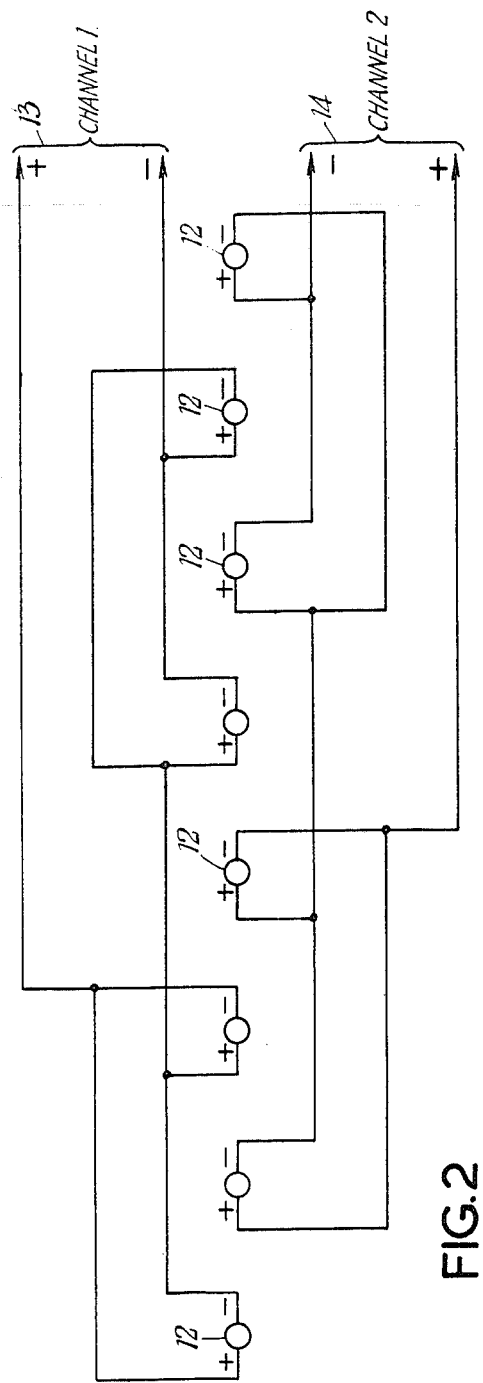
FIG. 2 shows the connections of the array of FIG. 1 in greater detail.

In the example illustrated in FIG. 1, a linear array of seismic vibration detectors (geophones) 12 is arranged on the inside of a fence or wall enclosing a restricted and open area. The detectors are buried beneath the ground surface and alternate detectors of the array are respectively connected to two wiring circuits 13 and 14 comprising cables also buried beneath the ground surface, so forming two independent interleaved sets of geophones. In order to achieve insensitivity to distant signals alternate geophones of each circuit are connected in antiphase resulting in cancellation of signals which arrive at any two geophones at the same amplitude and phase. Each individual antiphased pair will only be sensitive to near-by signals originating from points significantly closer to one geophone of the pair than to the other geophone of that pair, while signals originating from points midway between geophones of one pair will effectively be cancelled. The latter points, however, correspond to the geophone positions of the other wiring circuit, with the result that all vibrations originating close to the interleaved sets of detectors will be picked up by one or other of the circuits and passed along the cables as pulses. While FIG. 1 shows diagrammatically alternate geophones of each circuit as plus and minus respectively, FIG. 2 shows in more detail the connection of the geophones so that adjacent geophones in each array are in antiphase.

The two wiring circuits 13 and 14 are connected to separate amplifiers and the signals are then combined in an OR gate, the output of which is used to operated output alarm means in the form of an audio alarm or a light or the like to indicate the presence of a disturbance in the neighbourhood of the array.

Figure 3:
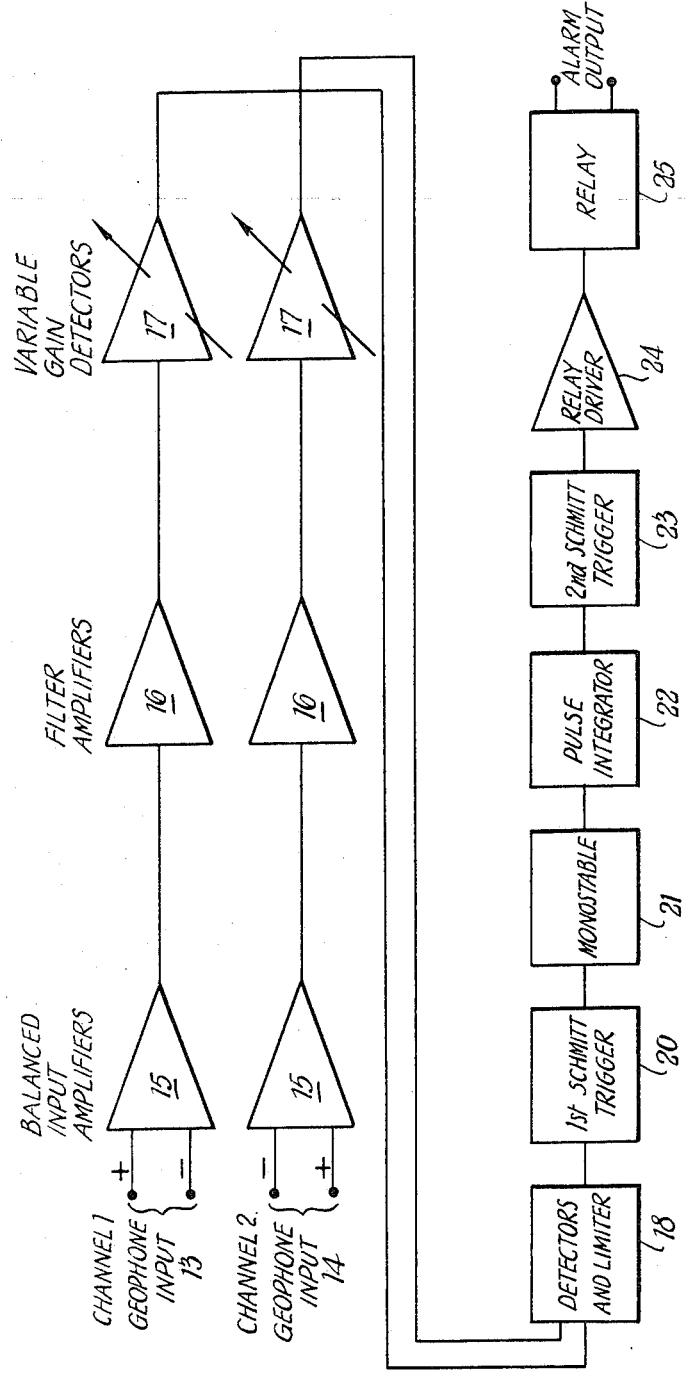
FIG. 3 is a circuit block diagram of an alarm system according to the invention.

In the one embodiment of the invention, additonal electronic circuitry shown in FIG. 3 is provided for recognizing the pattern of vibration to avoid operation of the alarm output by vibrations occurring at a too high repetition rate or by a single vibration or by vibrations at a too low repetition rate. In this embodiment, the pattern of vibration caused by a man's footfalls is selected as being the most suitable to set off the alarm. The circuit is therefore designed to accept only sequences of vibration bursts of predetermined lengths and repetition rate. This gives immunity to long bursts of traffic noise, even if repeated after short intervals and also to single heavy bursts caused by a brick falling adjacent the array for example, or the much higher repetition rate of smaller animal's footfalls.

After individual amplification and suitable filtering in associated balanced input amplifiers 15, filter amplifiers 16 and variable gain detectors 17, the two seismic signals from the circuits 13 and 14 are fed into envelope detectors 18, which also act as the OR gate; here the natural decay characteristics of the vibration bursts are artificially extended. This is achieved by allowing the detected signals to charge a capacitor whose discharge rate is controlled by circuit parameters.

The extended pulses so produced are fed via a diode limiter to a first Schmitt trigger circuit 20 with built-in hysteresis which, while triggering on a pulse of a certain size or greater, will only reset again after sufficient time has elapsed for the pulse to have decayed to the low level determined by the hysteresis. This circuit provides the required rejection of high repetition rate pulses or long noise pulses with short intervening intervals.

The leading edge of the Schmitt trigger output pulse is used to trigger a monostable circuit 21 which produces a standard length rectangular pulse each time the Schmitt circuit is triggered.

These regular pulses are fed to a pulse integrator 22, or diode pump, whose output voltage will be proportional to the rate of incoming pulses, in accordance with the present charge and discharge constants of the integrating capacitor circuit.

This resultant voltage is used to trigger a second Schmitt trigger circuit 23 at a fixed level which corresponds to the lowest footstep rate that it is desired to detect; single pulses or very low repetition rate pulses are insufficient to trigger the circuit.

This second Schmitt, in conjunction with a driver stage 24, operates a relay 25 whose contacts are made to indicate an alarm condition in any required manner.

In the embodiment illustrated in FIG. 4, the two seismic signals from the circuits 13 and 14, after individual amplification and suitable filtering in associated balanced input amplifiers 15, which incorporate continuous line fault monitoring and detection, filter amplifiers 16 and variable gain operational detectors 17, are combined, the operational detectors 17 also acting as an OR gate.

The envelope detected seismic pulses so produced are fed to first and second threshold detector circuits 118 and 119 and also to a peak detector 120 which stores a fixed proportion of the peak level of each pulse and can be remotely reset to the zero level by means of a clamp transistor 121. The first detector 118 will trigger on a pulse of a fixed size or greater, while the second detector 119 will trigger when the pulse falls to a level equal to the fixed proportion of the peak level previously reached and recorded in the peak detector and used as a reference for the second detector. This feature provides a consistent basis for timing the length and spacing of seismic pulses.

The first detector output trigger pulse is used to set a bistable 122 to the "S" condition. This releases the clamp on the peak detector 120 and also drives into two AND gates 123 and 124. The gate 123 is normally open and the output of the bistable 122 passes through to start a timing monostable 125 which in turn opens the gate 126 for period T1. The second detector output trigger pulse is used to reset the bistable 122 to the "R" condition. This clamps the peak detector 120 in readiness for the next signal pulse and also feeds into the gate 126. The second detector output pulse also drives an OR gate 127 via a monostable 130. If the reset signal from the bistable 122 arrives at gate 126 within the period T1, it will pass through to trigger a monostable 128 which generates a standard length pulse. If the delay before the second detector 119 is triggered exceeds the period T1, the reset signal fails to pass through the gate 126 and is rejected. This feature provides rejection of seismic pulses which are of too great a duration.

The monostable 130 drives the OR gate 127 for a period necessary to set a rechargeable timing monostable 129 which closes gate 123 and opens gate 124 for a period T2. If the bistable 122 is set again to the "S" condition by the first detector 118 within a time T2 from the previous reset, its output fails to pass through gate 123 into the monostable 125 and is effectively rejected. The gate 124 also drives the OR gate 127 which holds the monostable 129 in the charged condition as long as the gate 124 is held on by the bistable. This insures that if a time T2 elapses during the presence of a set condition from the bistable 122, the monostable 129 is recharged and held until the bistable resets to the "R" condition, so preventing the gate 123 from being opened during a signal pulse. This would oerwise allow the monostable 125 to be triggered near the end of a long signal pulse, which may then pass the bistable reset signal through the gate 126 which would be registered by monostable 128. A further link 133 is provided between the monostable 125 and the bistable 122 to allow the monostable reset output edge to reset the bistable 122 to the "R" condition in the event of the detector 119 failing to trigger on a very slowly decaying signal. These features provide the rejection of high repetition rate pulses.

The standard length pulses from the monostable 128 are fed into a leaky pulse integrator 131 whose output will be proportional to the rate of incoming pulses in accordance with the present charge and discharge constants of the intergrating capacitor circuit. This resultant voltage is used to trigger a Schmitt trigger circuit 132 at a fixed level which corresponds to the lowest footstep rate that it is desired to detect, single pulses or very low repetition rate pulses being insufficient to trigger the circuit. This Schmitt trigger circuit 132 produces an alarm signal output which can operate an alarm and drive a display system which can indicate and memorise an alarm condition in any required manner.

It will be appreciated that the loop formed by gates 124 and 127 and monostable 129 could be dispensed with if a differentiator were inserted between the input to gate 123 and the set output of bistable 122, so avoiding the condition described. This would eliminate gates 124 and 127, the latter being replaced by a direct connection to monostable 129.

While this alarm circuit is tuned to detect human intruders, it will be appreciated that by variations in the levels of time constants described the system is sufficiently versatile to detect various types of movement in a wide variety of environments. Such a system eliminates the need for human intelligence to interpret the various types of vibrations normally present in the ground and gives a positive alarm signal which may be monitored as remotely as required, while eliminating false alarms.

The array of geophones may be split up into a number of parts to provide a multi-channel system to give information about the location of an intruder on a large site.

I claim:

1. An alarm system comprising an array of siesmic vibration detector means, amplifier means producing an output signal having a peak amplitude, a wiring circuit connecting said detector means to said amplifier means, a first trigger circuit, first threshold detector means to set said first trigger circuit in response to an output signal from said amplifier means of greater than a predetermined amplitude, second threshold detector means to reset said first trigger circuit when said output signal from said amplifier means falls by a predetermined amount from its peak amplitude, pulse generator means responsive to each setting of said first trigger circuit to generate a pulse signal of predetermined amplitude and duration, said pulse generator means having an output, a second trigger circuit having an input, circuit means connected between the output of said pulse generator means and the input of said second trigger circuit and responsive to a pulse generation rate higher than a predetermined value to set said second trigger circuit, and alarm output means responsive to give an alarm when said second trigger circuit is set.

2. An alarm system comprising an array of seismic vibration detector means, a wiring circuit connected to said detector means, circuit means connected to said wiring circuit to produce electrical signal pulses representing detected seismic vibrations, a first threshold detector operable to generate a first trigger pulse in response to a signal pulse of an amplitude exceeding a predetermined value, a bistable device responsive to said first trigger pulse to assume a first one of its two stable conditions, a first monostable device, a normally open first gate connecting the bistable device to the first monostable device whereby the first monostable device generates a first timing signal of predetermined duration in response to the bistable device assuming said first condition when said first gate is open, a normally closed second gate arranged to be opened by the first timing signal for the duration thereof, a second threshold detector responsive to the decay of the signal pulse to a selected value to produce a second trigger pulse operable to switch the bistable device to the second of its two stable conditions, and a second monostable device responsive through said second gate to the bistable device assuming said second condition to generate an output pulse of predetermined duration.

3. An alarm system according to claim 2 including an integrating circuit with preset charge and discharge constants responsive to the output pulses from the second mono-stable device to produce an integrated output of a magnitude which is a function of the repetition rate of the output pulses and a trigger circuit arranged to produce and alarm signal when said integrated output exceeds a predetermined value.

4. An alarm system according to claim 2 including a peak level detector operable to detect the peak level of a signal pulse and to store a fixed proportion thereof to determine said selected value of response of said second threshold detector.

5. An alarm system according to claim 3 including a third mono-stable device responsive to said second trigger pulse to close said normally open first gate for a predetermined interval of time to prevent said first monostable device responding to the bistable device assuming said first condition during said predetermined interval of time.

6. An alarm system according to claim 5 including a normally closed third gate arranged to be opened by said third monostable device for said predetermined interval of time, said third gate being responsive to said bistable device being in said first condition to maintain said third monostable device in the condition to close said first gate.

7. An alarm system according to claim 6 including an OR gate connected between said third monostable device and said third gate and a fourth monostable device responsive to said second trigger pulse to drive the OR gate for a period necessary to operate the third monstable device.

8. An alarm system according to claim 1, wherein each of said vibration detector means comprises a single vibration detector.

9. An alarm system according to claim 1 wherein each of said vibration detector means comprises a plurality of vibration detectors.

* * * * *

UNITED STATES PATENT OFFICE
CERTIFICATE OF CORRECTION

Patent No. 3,805,260  Dated April 16, 1974

Inventor(s) Peter Jack BAROWITZ

It is certified that error appears in the above-identified patent and that said Letters Patent are hereby corrected as shown below:

In the heading, add the following:

ASSIGNEE: Elliott Brothers (London) Limited

RELATED U.S. APPLICATIONS:

Continuing Application of Serial No. 780,373 filed December 2, 1968.

Signed and sealed this 13th day of May 1975.

(SEAL)
Attest:

RUTH C. MASON
Attesting Officer

C. MARSHALL DANN
Commissioner of Patents
and Trademarks